United States Patent Office 3,074,928
Patented Jan. 22, 1963

3,074,928
BASIC-SUBSTITUTED PYRIMIDO-[5,4-D]-PYRIMIDINES
Josef Roch and Gerwin Beisenherz, Biberach an der Riss, Germany, assignors to Dr. Karl Thomae G.m.b.H., Biberach an der Riss, Germany, a corporation of Germany
No Drawing. Filed June 23, 1960, Ser. No. 38,092
Claims priority, application Germany June 25, 1959
9 Claims. (Cl. 260—210)

This invention relates to basic-substituted pyrimido-[5,4-d]-pyrimidines and to various methods of preparing such compounds.

More particularly, the present invention relates to mono-, di-, tri- and tetra-basic-substituted pyrimido-[5,4-d]-pyrimidines having the general structural formula

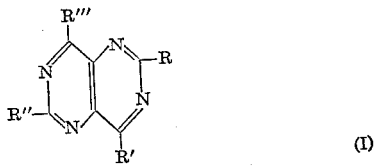

(I)

wherein one of substituents R, R', R" and R''' is a basic substituent selected from the group consisting of esterified hydroxyalkyl-amino, etherified hydroxyalkyl-amino and acetalized hydroxyalkyl-amino, and the remainder of said substituents are selected from the group consisting of hydrogen, alkyl, aryl, aralkyl, halogen, hydroxyl, substituted thiol, amino, substituted amino, hydrazyl, substituted hydrazyl, guanidyl, substituted guanidyl, heterocycles, esterified hydroxyalkyl-amino, etherified hydroxyalkyl-amino and acetalized hydroxyalkyl-amino, as well as to their non-toxic, pharmacologically acceptable acid addition salts.

The compounds according to the present invention may be prepared from the analogous hydroxyalkyl-amino-substituted pyrimido-[5,4-d]-pyrimidines, disclosed in copending application Serial No. 21,609, filed April 12, 1960, by esterifying or etherifying or acetalizing some or all of the hydroxyalkyl-amino radicals by methods well known in the chemical arts.

A few of typical examples of hydroxyalkyl-amino-substituted pyrimido-[5,4-d]-pyrimidines disclosed in said copending application which may be esterified, etherified or acetalized to produce the corresponding compounds embraced by Formula I above are the following:

2,6 - bis - (diethanol - amino) - 4,8 - bis - (2',6' - dimethyl-morpholyl-pyrimido-[5,4-d]-pyrimidine,
2,6 - bis - (diethanol - amino) - 4,8 - bis - (2',6' - dimethyl-piperidyl)-pyrimido-[5,4-d]-pyrimidine,
2,6 - bis - (diethanol - amino) - 4,8 - bis - 1',2',5',6' - tetra-hydro-pyridyl)pyrimido-[5,4-d]-pyrimidine,
2,6 - dimorpholyl - 4,8 - di - (methyl - ethanol-amino)-pyrimido-[5,4-d]-pyrimidine,
2,4,6,8 - tetra - (methyl - ethanol - amino) - pyrimido-[5,4-d]pyrimidine,
2 - (diethanol - amino) - 4,8 - dimorpholyl - pyrimido-[5,4-d]-pyrimidine,
2 - (β - hydroxyethyl - amino) - 4,8 - diamino - pyrimido-[5,4-d]-pyrimidine,
2 - (methyl - ethanol - amino) - 4,8 - di - (methyl - amino)-pyrimido[5,4-d]-pyrimidine,
4,8 - di - (methyl - ethanol - amino) - pyrimido - [5,4-d]-pyrimidine,
4,8 - di - (β - hydroxyethyl - amino) - pyrimido - [5,4-d]-pyrimidine,
2 - morpholyl - 4,8 - di - (β - hydroxyethyl - amino) - 6-phenyl-pyrimido-[5,4-d]-pyrimidine,
2 - chloro - 4,8 - bis - (diisopropanol - amino) - pyrimido-[5,4-d]-pyrimidine,
2,6 - dichloro - 4,8 - bis - (diethanol - amino) - pyrimido-[5,4-d]-pyrimidine,
2,4,8 - tri - (β - hydroxyethyl - amino) - 6 - thio - pyrimido-[5,4-d]-pyrimidine,
2,6 - bis - (diethanol - amino) - 4 - piperidyl - 8 - ethylthio-pyrimido-[5,4-d]-pyrimidine,
2 - bis - (diethanol - amino) - 4,8 - di - (ethylthio)-pyrimido-[5,4-d]-pyrimidine,
2 - (β - hydroxyethyl - amino) - 4,8 - dihydroxy - pyrimido-[5,4-d]-pyrimidine,
2,6 - di - (ethoxy) - 4,8 - bis - (diethanolamino) - pyrimido-[5,4-d]-pyrimidine,
2,6 - bis - (diethanol - amino) - 4,8 - di - (ethoxy) - pyrimido-[5,4-d]-pyrimidine, and
2 - ethoxy - 4,8 - di - (methyl - ethanol - amino) - pyrimido-[5,4-d]-pyrimidine.

The esters of the hydroxyalkyl-amino-substituted pyrimido-[5,4-d]-pyrimidines having the general structural Formula I may be prepared in the same manner as esters of other alcohols or polyalcohols, that is, by reacting them with inorganic or organic acids or derivatives of such acids. Very advantageous is the reaction with acid halides and acid anhydrides, including mixed carboxylic acid-carbonic acid anhydrides, and ketenes or diketenes, if necessary in the presence of catalytically-active substances, such as tertiary amines. However, another suitable method involves an ester exchange reaction with lower alkanol esters and the desired carboxylic acids, possibly in the presence of catalytic amounts of an alkali metal, an alkali metal carbonate, an alkali metal amide or an alkali metal hydroxide, accompanied by removal of the readily volatilizable alcohol from the equilibrium of the reaction. In those instances where the chloride of the desired carboxylic acid is not readily accessible, the reaction of the pyrimido-[5,4-d]-pyrimidyl alkyl-amino alcohols with free carboxylic acids, accompanied by intermediate formation of reactive derivatives of the acids, offers certain advantages. A mild esterification in the cold by chemical binding of the water of esterification, for instance with the aid of carbodiimides, is particularly advantageous for esterification with sensitive carboxylic acids.

In addition to polybasic inorganic acids, suitable acid reactants for the esterification are primarily those carboxylic acids or their derivatives which comprise additional substituents, especially hydrophilic groups, such as hydroxyl, carboxyl, sulfonic acid or free or substituted amino radicals, including quaternary ammonium groups, or also substituents which may be transformed into such radicals, for example halogen, carbobenzoxy or carbethoxyamino substituents. These last-mentioned substituents may be transformed into the desired groups by well-known methods after the esterification has been completed. For example, a convenient method, which is used very often in protein chemistry, in the protection of the amino group by a carbethoxy or carbobenzoxy radical and subsequent splitting off of this radical after esterification.

During the esterification of the pyrimido-[5,4-d]-pyrimidyl aminoalcohols with intramolecular anhydrides of dicarboxylic acids esters with free carboxylic groups are obtained the basic addition salts of which are characterized by a particularly good water-solubility in the physiological pH-range.

While the starting materials for the esterification may most frequently be the free pyrimido-[5,4-d]-pyrimidyl aminoalcohols, it is also possible to replace the hydroxyl groups of the hydroxyalkyl radicals first by a halogen and then react the haloalkyl derivatives thus obtained with carboxylic acid salts, especially with silver salts, to prepare the desired esters. This particular method is especially advantageous when the pyrimido-[5,4-d]-pyrimidyl aminoalcohols are to be esterified with polyhydroxy-carboxylic acids.

A few representative examples of suitable acid esterification reactants which may be used for esterification of the pyrimido-[5,4-d]-pyrimidyl-aminoalcohols are the following: Acetic acid anhydride, succinic acid anhydride, glutaric acid anhydride, maleic acid anhydride, diacetyl-tartaric acid anhydride, phthalic acid anhydride, sarcosine anhydride, camphoric acid anhydride, chloroacetyl chloride, phenyl-acetic acid chloride, salicylic acid chloride, carbobenzoxy-glycine chloride, betaine chloride, morpholyl-acetic acid chloride hydrochloride, piperidyl-acetic acid ethyl ester, gluconic acid or its silver salt, acetylglutamic acid anhydride, ethanedisulfonic acid anhydride, β-sulfopropionic acid chloride, sulfosalicylic acid or its chloride, trichloroacetyl chloride, carbobenzoxy-glycyl-glycine, chloroformic acid esters, sulfuryl chloride, phosphonic acid chloride, formic acid and carbobenzoxy-glycine-cyanomethyl ester.

The ethers of the pyrimido-[5,4-d]-pyrimidyl aminoalcohols may be prepared by the same methods as ethers of other complicated alcohols; that is, by reacting the corresponding pyrimido-[5,4-d]-pyrimidyl-amino alkali metal alcoholate with halogen-containing reactants, such as methyl iodide, benzyl chloride, allyl bromide, β-chloroethanol and the like. However, it is also possible to produce the ethers of the pyrimido-[5,4-d]-pyrimidyl aminoalcohols by first preparing the above-mentioned pyrimido-[5,4-d]-pyrimidyl aminoalkyl halides and then reacting the same with alkali metal alcoholates. Still another method of obtaining the pyrimido-[5,4-d]-pyrimidyl aminoalcohol ethers comprises reacting the free pyrimido-[5,4-d]-pyrimidyl aminoalcohols with alkyleneoxides or alkyleneimines.

The hemi-acetals and acetals of the pyrimido-pyrimidyl aminoalcohols having the general structural Formula I above may be prepared in a similar fashion to the hemi-acetals and acetals of other alcohols, that is by reacting the pyrimido-[5,4-d]-pyrimidyl aminoalcohols with aldehydes or corresponding compounds such as ortho-formic acid esters.

As a particular embodiment, the gluco-uronides of the pyrimido-[5,4-d]-pyrimidyl aminoalcohols, which belong to the class of acetals having the structural Formula I, may be prepared by administering the pyrimido-[5,4-d]-pyrimidyl aminoalcohols to mammals which are capable of transforming alcohols into the corresponding gluco-uronides in the body and eliminating the gluco-uronides, thus formed, from the body. Particularly suitable mammals for this purpose are dogs, rats, and rabbits. The pyrimido-[5,4-d]-pyrimidyl aminoalcohols are preferably administered to the mammals by intraveneous injection. The gluco-uronide which is formed in the body of the animal may then be withdrawn in very simple fashion, for example by applying a catheter to the gall bladder and drawing off the gall bladder secretion, and thereafter isolating the gluco-uronides by working up the gall bladder secretion in a manner known per se.

Among the hemi-acetals and acetals of the pyrimido-[5,4-d]-pyrimidyl aminoalcohols according to the present invention, those formed with aldehydes which comprise additional substituents such as halogen or hydrophilic groups are particularly interesting. Especially valuable are those hemi-acetals and acetals formed with hydroxy-aldehydes or polyhydroxy-aldehydes because they are characterized by a very good water-solubility in a neutral pH range. On the other hand, reaction of the pyrimido-[5,4-d]-pyrimidyl aminoalcohols with chloral, compounds are obtained which not only contain the effective pyrimido-[5,4-d]-pyrimidine derivatives, but also the sedatively-active chloral in a bound form.

Typical examples of aldehydes with which the pyrimido-[5,4-d]-pyrimidyl aminoalcohols may be reacted to obtain the corresponding hemi-acetals or acetals are the following: acetaldehyde-di-potassium sulfonate, chloro - acetaldehyde, dichloro - acetaldehyde, chloral, fluoral, chloro-acetaldehyde-sodium sulfonate, glyoxylic acid, formaldehyde, dimethyl-amino-acetaldehyde, pyridyl-aldehyde, monosaccharides with 2 to 7 oxygen atoms, such as ribose, desoxy-ribose, ribose-phosphoric acid and glucose, amino sugars such as glucose amine, uronic acids such as gluco-uronic acid and galacto-uronic acid, oligo saccharides, such as saccharose, gluco-rhamnoside and gluco-rhamno-rhamnoside.

Similar to the esterification of the pyrimido-[5,4-d]-pyrimidyl aminoalcohols, their acetalization is in many cases advantageously effected with the aldehydes themselves but rather with especially reactive derivatives of the aldehydes which have protected hydroxyl or amino groups and under as gentle conditions as possible; this is particularly true when the acetalizing agent is a complicated aldehyde of the sugar type or an amino aldehyde. For example, for the production of the glucosides it is advantageous to react the corresponding pyrimido-[5,4-d]-pyrimidyl aminoalcohols with acetobromoglucose or aceto-chloro-glucose in the presence of silver carbonate and saponify the acetyl groups of the reaction product under alkaline conditions.

It will be evident to those skilled in the art that the various processes described above, at least those in which pyrimido-[5,4-d]-pyrimidine derivatives wth several hydroxy-alkyl radicals are used as starting materials, do not always produce uniform reaction products. The mixtures of mono-esters, di-esters, tri-esters and tetra-esters or mono-acetals, di-acetals, tri-acetals and tetra-acetals which may be formed by any of these reactions may be separated into their individual components either by classic methods or with the aid of adsorption chromatography, for instance.

Since the starting materials for the production of the compounds according to the present invention are always solids, any of the above reactions are carried out in the presence of solvents which are inert under the reaction conditions, unless the other reaction component is a liquid and may serve as a solvent medium. Examples of suitable inert solvents are ether, benzene, acetone, dioxane, pyridine and dimethylformamide.

The following examples will further illustrate the present invention and enable others skilled in the art to understand it more completely. It will be understood, however, that the invention is not limited to the examples given below.

EXAMPLE 1

*2,6-Bis-(Diethanol-Amino) - 4,8 - Dipiperidyl-Pyrimido-[5,4-d]-Pyrimidine-Tetra-Acetic Acid Ester*

A mixture of 1 gm. (0.002 mol) 2,6-bis-(diethanol-amino)-4,8-dipiperidyl-pyrimido - [5,4-d] - pyrimidine, 2 cc. (about 0.02 mol) acetic acid anhydride and 2 cc. glacial acetic acid was gently boiled for about 5 minutes. Thereafter, the resulting solution was poured into about 50 cc. water, whereupon the reaction product separated out in the form of a yellow crystalline precipitate. The precipitate was separated by vacuum filtration, washed with water and dried. For analysis, it was recrystallized twice from 30 to 40 cc. ethanol. The yield was 0.9 gm., which corresponds to 67% of theory. The purified product was obtained in the form of felted yellow needles having a melting point of 123 to 124° C.

Analysis.—$C_{32}H_{48}N_8O_8$: Molecular weight, 672.8. Calculated: C, 57.12%; H, 7.19%. Found: C, 57.10%; H, 7.33%.

Probable structural formula:

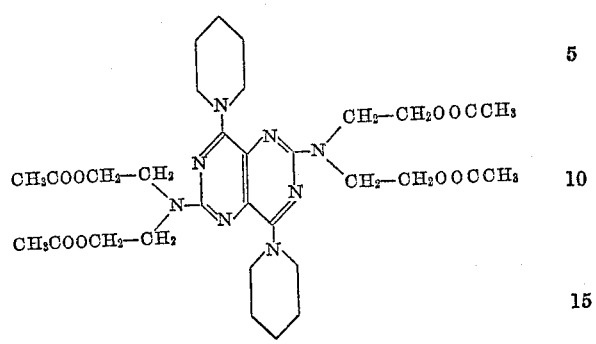

EXAMPLE 2

Halo-Carboxylic Acid Esters of Various Pyrimido-[5,4-d]-Pyrimidyl-Aminoalcohols

(a) *2,6-bis-(diethanol-amino) - 4,8 - dipiperidyl-pyrimido-[5,4-d]-pyrimidine-tetra-(β-chloro-propionic acid) ester.*—A mixture of 2.5 gm. (0.005 mol) 2,6-bis-(diethanol-amino)-4,8-dipiperidyl-pyrimido - [5,4-d] - pyrimidine, 3.7 gm. (0.03 mol) β-chloro-propionyl chloride and 25 cc. ethylene chloride was refluxed for 30 minutes and the solvent was then distilled off in vacuo. The tacky residue was digested with about 50 cc. water, whereby it solidified after a short period of time. The solidified residue was separated by vacuum filtration, triturated with a small amount of water in a mortar, again separated by vacuum filtration, washed and finally dried in vacuo at room temperature. For purification, the product was recrystallized twice from methanol. The yield was 1.9 gm., which corresponds to 22% of theory. The purified product was obtained in the form of light yellow microcrystalline needles having a melting point of 90 to 92° C.

*Analysis.*—$C_{36}H_{52}Cl_4N_8O_8$: Molecular weight, 866.7. Calculated: C, 49.89%; H, 6.05%. Found: C, 50.20%; H, 6.25%.

Probable structural formula:

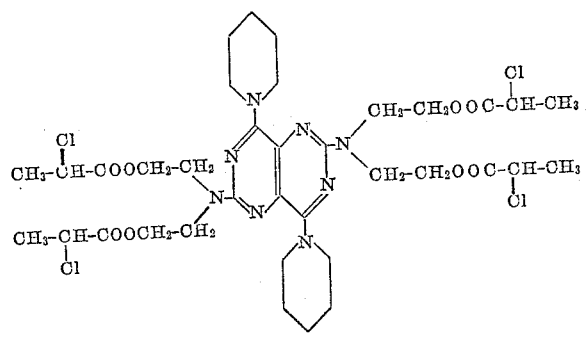

(b) *2-chloro - 4,8 - dipiperidyl - 6 - diethanol-amino-pyrimido - [5,4-d] - pyrimidine - di - (chloro-acetic acid)-ester.*—A mixture of 0.005 mol 2-chloro-4,8-dipiperidyl-6-diethanol-amino-pyrimido - [5,4-d] - pyrimidine, 0.03 mol chloro-acetyl-chloride and 25 cc. dimethylformamide was refluxed for 30 minutes. Thereafter, the dimethylformamide was distilled off in vacuo and the residue was taken up in water. A honey-colored, tacky mass formed which did not solidify even after extended standing. The product separated, dried at room temperature in vacuo and, without further purification, was subjected to analysis.

*Analysis.*—$C_{24}H_{32}Cl_3N_7O_4$: Molecular weight, 588.9. Calculated: C, 48.94%; H, 5.47%. Found: C, 48.90%; H, 6.22%.

Probable structural formula:

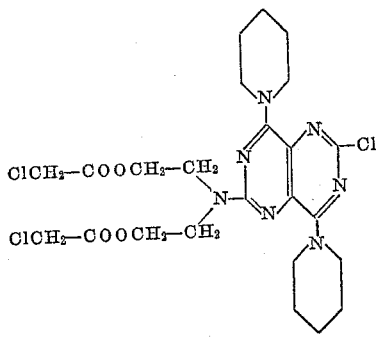

EXAMPLE 3

2,6-Bis-(Diethanol-Amino) - 4,8 - Dipiperidyl-Pyrimido-[5,4-d]-Pyrimidine-Tetra-(Chloro-Acetic Acid)-Ester and 2,6 - Bis - (Diethanol - Amino) - 4,8 - Dipiperidyl-Pyrimido - [5,4 - d] - Pyrimidine - Tetra - (Morpholyl-Acetic Acid)-Ester

(a) *2,6-bis-(diethanol-amino) - 4,8 - dipiperidyl - pyrimido - [5,4-d] - pyrimidine-tetra-(chloro-acetic acid)-ester.*—3 gm. (about 0.025 mol) chloro-acetyl chloride were slowly poured into a suspension of 2.5 gm. (0.05 mol) 2,6-bis-(diethanol-amino)-4,8-dipiperidyl-pyrimido-[5,4-d]-pyrimidine in 50 cc. dry acetone, and the resulting reaction mixture was refluxed for 30 minutes. Subsequently, the solution obtained thereby was taken up in 500 cc. water, whereby 2,6-bis-(diethanol-amino)-4,8-dipiperidyl-pyrimido - [5,4-d] - pyrimidine-tetra-chloro-acetic acid ester separated out, as a greasy yellow precipitate, which, however, solidified after a short period of time. The precipitate was separated by vacuum filtration, washed with water and dried at room temperature in a vacuum desiccator. The yield was 3.7 gm., which corresponds to 91% of theory. After recrystallization from methanol, the product was obtained in the form of small, light yellow prisms having a melting point of 88 to 90° C.

*Analysis.*—$C_{32}H_{44}N_8O_8Cl_4$: Molecular weight, 810.6. Calculated: C, 47.41%; H, 5.47%. Found: C, 47.50%; H, 5.69%.

Probable structural formula:

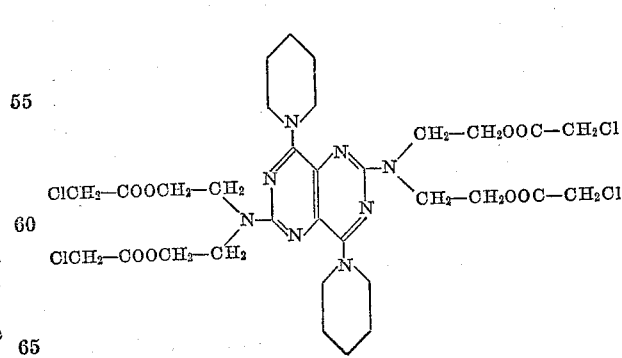

(b) *2,6-bis-(diethanol-amino)-4,8-dipiperidyl-pyrimido-[5,4-d]-pyrimidine-tetra-(morpholyl-acetic acid)-ester.*—A mixture of 2.0 gm. (0.0025 mol) 2,6-bis-(diethanol-amino)-4,8-dipiperidyl-pyrimido - [5,4-d] - pyrimidine-tetra-chloroacetic acid ester and 3 cc. morpholine was heated for 15 minutes at about 100° C. Upon admixing the resulting solution with 40 cc. water, the raw 2,6-bis-(diethanolamino)-4,8-dipiperidyl-pyrimido-[5,4-d]-pyrimidine-tetra-(morpholyl-acetic acid) ester separated out in the form of an olive-colored greasy precipitate. This precipitate was separated and reprecipitated twice from 500 cc. of very dilute hydrochloric acid with the aid of ammonia. The product was obtained thereby in crystalline form, that is in the form of prisms having a melting point of about 80° C.; the crystalline substance, however, again sintered into a tacky, olive-colored mass upon standing in a vacuum desiccator over phosphorus pentoxide. The yield was 1.1 gm. which corresponds to 44% of theory.

*Analysis.*—$C_{48}H_{76}N_{12}O_{12}$: Molecular weight, 1013.2. Calculated: C, 56.90%; H, 7.56%. Found: C, 56.40%; H, 7.84%.

substantially distilled off and the residue was digested with 50 cc. water. Finally, the raw reaction product, which solidified after a short period of time, was separated, washed with water and dried at room temperature in vacuo. The yield was 3.4 gm., which corresponds to 75% of theory. For analysis, the product was reprecipitated twice from dilute ammonia with glacial acetic acid and was then recrystallized once from a mixture of methanol and water (1:1). The purified product was obtained in the form of a pale yellow, microcrystalline powder having a melting point of 143 to 145° C.

*Analysis.*—$C_{40}H_{56}N_8O_{16}$: Molecular weight, 904.9. Calculated: C, 53.09%; H, 6.24%. Found: C, 52.80%; H, 6.49%.

Probable structural formula:

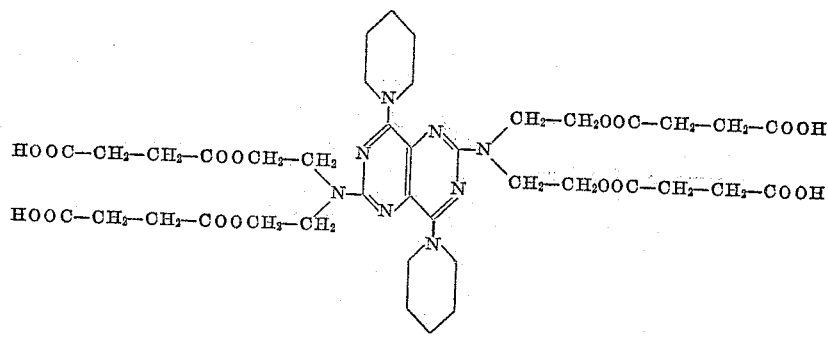

Probable structural formula:

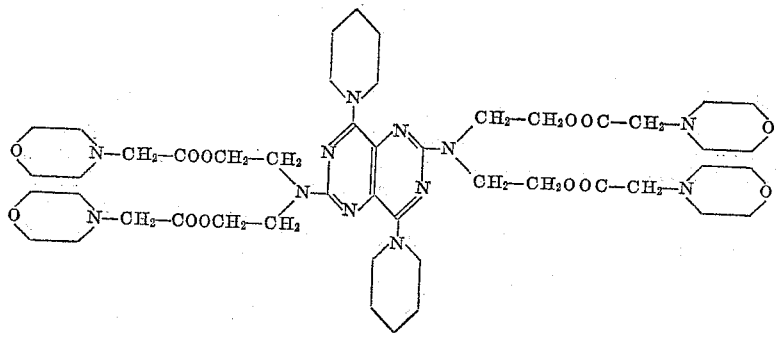

Using a procedure analogous to that described above,

EXAMPLE 4

*Tetra-(Dicarboxylic Acid)-Semi-Esters of Various Pyrimido-[5,4-d]-Pyrimidyl-Amino Alcohols*

(a) *2,6-bis-(diethanol-amino)-4,8-dipiperidyl-pyrimido-[5,4-d]-pyrimidine-tetra-succinic acid semiester.*— A mixture of 2.5 gm. (0.005 mol) 2,6-bis-(diethanol-amino)-4,8-dipiperidyl-pyrimido-[5,4-d]-pyrimidine, 2.5 gm. (0.05 mol) succinic acid anhydride and 50 cc. acetone was refluxed for about 30 minutes. Thereafter, the solvent was the following compounds were prepared from the starting materials indicated in each case:

(b) *2,6-bis-(diethanol-amino)-4,8-dimorpholyl-pyrimido-[5,4-d]-pyrimidine-tetra-succinic acid semi-ester.*— Melting point 159 to 161° C., from 2,6-bis-(diethanol-amino)-4,8-dimorpholyl-pyrimido-[5,4-d]-pyrimidine and succinic acid anhydride.

Probable structural formula:

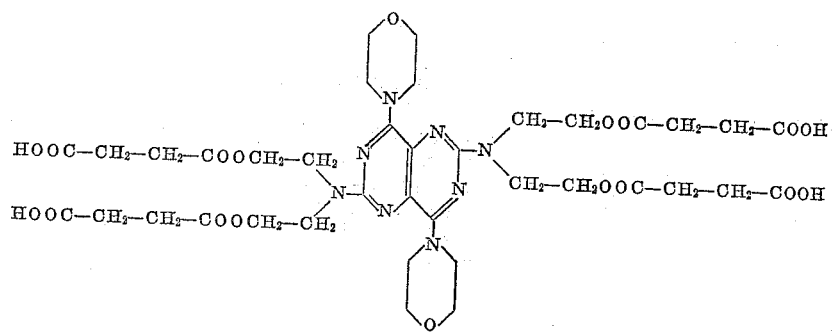

(c) *2,6-bis-(diethanol-amino)-4,8-dipiperidyl-pyrimido-[5,4-d]-pyrimidine-tetra-glutaric acid semiester.*—Melting ing point about 90° C., from 2,6-bis-(diethanol-amino)-4,8-dipiperidyl-pyrimido-[5,4-d]-pyrimidine and glutaric acid anhydride.

Probable structural formula:

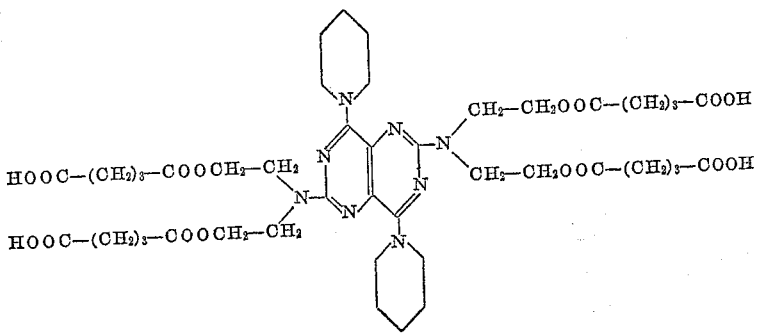

(d) *2,4,6,8 -tetra - (β-hydroxy-ethyl-amino)-pyrimido-[5,4-d]-pyrimidine-tetra-succinic acid semiester.*—Melting point 182 to 185° C., from 2,4,6,8-tetra-(β-hydroxy-ethyl-amino)-pyrimido-[5,4-d]-pyrimidine and succinic acid anhydride.

Probable structural formula:

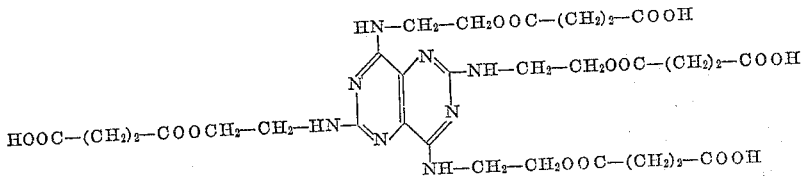

(e) *2,4,6,8-tetra - (β - hydroxy-ethyl-amino) -pyrimido-[5,4-d]-pyrimidine-tetra-glutaric acid semiester.*—Melting point 110 to 115° C., from 2,4,6,8-tetra-(β-hydroxy-ethyl-amino)-pyrimido-pyrimidine and glutaric acid anhydride.

Probable structural formula:

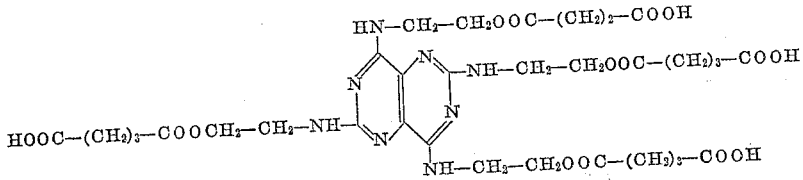

EXAMPLE 5

*Tetra-Salicylic Acid Esters of Various Pyrimido-[5,4-d]-Pyrimidyl-Aminoalcohols*

(a) *2,6-bis-(diethanol-amino)-4,8-dipiperidyl-pyrimido-[5,4-d]-pyrimidine-tetra-salicylic acid ester.*—2.5 gm. (0.005 mol) of 2,6-bis-(diethanol-amino)-4,8-dipiperidyl-pyrimido-[5,4-d]-pyrimidine were suspended in 50 cc. acetone, 3.2 gm. (0.02 mol) salicylic acid chloride were added to the suspension and the resulting mixture was refluxed for about 30 minutes. The reaction solution, thus obtained, was taken up in about 100 cc. water, whereupon the reaction product precipitated in the form of a crystalline mass. The precipitate was separated by vacuum filtration, washed and dried. The yield of raw product was 2.6 gm., which corresponds to 53% of theory. For purification, the raw product was reprecipitated once from acetone by adding water to the acetone solution. The purified product was obtained in the form of small pale yellow needles having a melting point of 151 to 153° C.

*Analysis.*—$C_{52}H_{56}N_8O_{12}$: Molecular weight, 985.0.

Calculated: C, 63.40%, H, 5.73%. Found: C, 63.30%; H, 5.84%.

Probable structural formula:

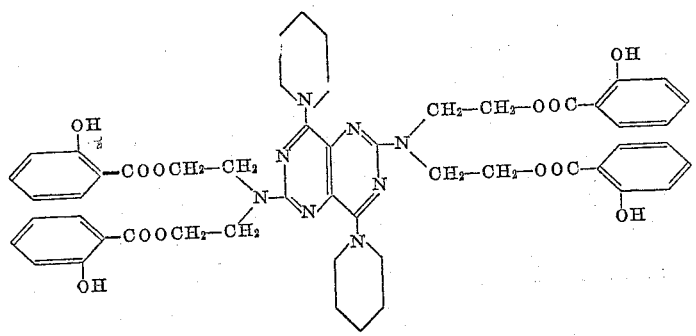

(b) *2,6-bis-(diethanol-amino)-4,8-dimorpholyl-pyrimido-[5,4-d]-pyrimidine-tetra-salicylic acid ester.*—Using a procedure analogous to that described under (a) above, but substituting 2,6-bis-(diethanol-amino)-4,8-dimorpholyl-pyrimido-[5,4-d]-pyrimidine, for 2,6-bis-(diethanol-amino)-4,8-dipiperidyl-pyrimido-[5,4-d]-pyrimidine, a reaction product was obtained which, reprecipitated from a mixture of methanol and acetone (1:1), took the form of microcrystalline, light yellow needles having a melting point of 158 to 160° C.

Probable structural formula:

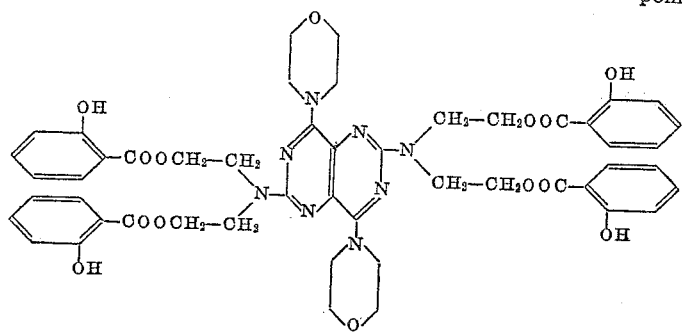
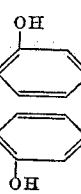

EXAMPLE 6

Succinic Acid Semi-Esters of Various Pyrimido-[5,4-d]-Pyrimidyl-Amino-Alcohols (a) 2,6 - dimorpholyl - 4,8 - di - (propyl - ethanol-amino) - pyrimido - [5,4 - d] - pyrimidine - di - succinic acid semiester.—A mixture of 2.5 gm. (0.005 mol) 2,6-di - morpholyl - 4,8 - dipropyl - ethanol - amino - pyrimido-[5,4-d]-pyrimidine, 2.5 gm. (0.025 mol) succinic acid anhydride and 50 cc. acetone was refluxed for about 30 minutes. Thereafter, the solvent was partially distilled off, whereupon the reaction product separated out as a crystalline substance. The yield was 3.0 gm., which corresponds to 85% of theory. After recrystallizing the raw product twice from 0.2 N ammonia, the purified product was obtained in the form of a yellow microcrystalline powder having a melting point of 173 to 175° C.

Analysis.—$C_{38}H_{48}N_8O_{10}$: Molecular weight, 704.8. Calculated: C, 54.54%; H, 6.83%. Found: C, 54.20%; H, 7.28%.

Probable structural formula:

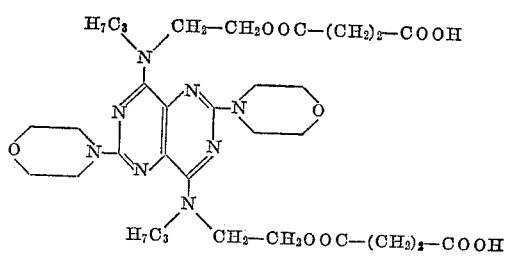

Using a procedure analogous to that described above, the following compounds were prepared from the starting materials indicated in each case:

(b) 2,4,6,8 - tetra - (diethanol - amino) - pyrimido-[5,4-d]-pyrimidine-octa-succinic acid semiester.—From 2,4,6,8 - tetra - (diethanol - amino) - pyrimido - [5,4 - d]-pyrimidine and succinic acid anhydride.

After a single reprecipitation from dilute ammonia the product was recrystallized from methanol, yielding the purified product in the form of very small, fine, pale yellow needles having a melting point of 152 to 154° C.

Probable structural formula:

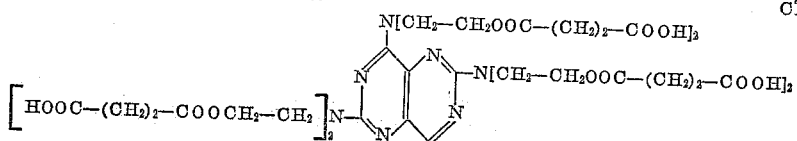

(c) 2,4,8 - tri - (methyl - ethanol - amino) - 6 - (ethyl-thio)-pyrimido-[5,4-d]-pyrimidine-trisuccinic acid semiester.—From 2,4,8-tri-(methyl-ethanol-amino)-6-(ethylthio)-pyrimido-[5,4-d]-pyrimidine and succinic acid anhydride.

Reprecipitated from acetone with the aid of water, the purified product was obtained in the form of a light-yellow microcrystalline powder (prisms) having a melting point of 78 to 81° C.

Probable structural formula:

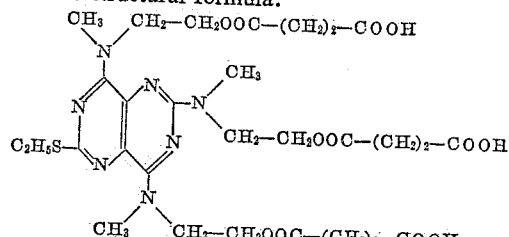

(d) 2 - (β - hydroxy - ethyl - amino) - 4,8 - bis - (dimethyl - amino) - pyrimido - [5,4 - d] - pyrimidine - succinic acid semiester.—From 2-(β-hydroxy-ethyl-amino)-4,8-dimethyl-amino-pyrimido-[5,4-d]-pyrimidine and succinic acid anhydride.

Reprecipitated from 0.5 N ammonia with the aid of glacial acetic acid, the purified product was obtained in the form of a virtually colorless powder having a melting point of 210 to 212° C.

Probable structural formula:

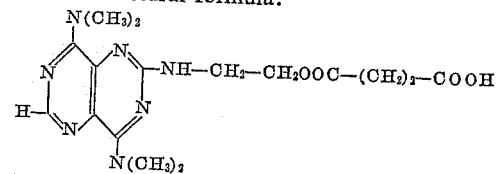

(e) 4,8 - di - (methyl - ethanol - amino) - pyrimido-[5,4-d]-pyrimidine-disuccinic acid semiester.—From 4,8-di - (methyl - ethanol - amino) - pyrimido - [5,4 - d]-pyrimidine and succinic acid anhydride.

Recrystallized from water the pure product was obtained in the form of a virtually colorless micro-crystalline powder having a melting point of 140 to 141° C.

Probable structural formula:

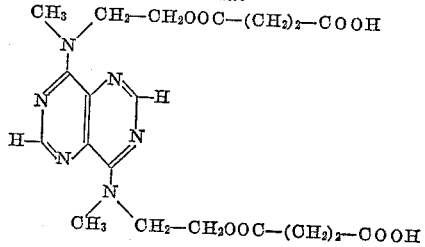

(f) 4,8 - bis - (diethanol - amino) - pyrimido - [5,4- d]-pyrimidine-tetra-succinic acid semiester.—From 4,8-bis-(diethanol-amino)-pyrimido-[5,4-d]-pyrimidine and succinic acid anhydride.

Recrystallized from water the purified product was obtained in the form of a colorless powder having a melting point of 129 to 131° C.

Probable structural formula:

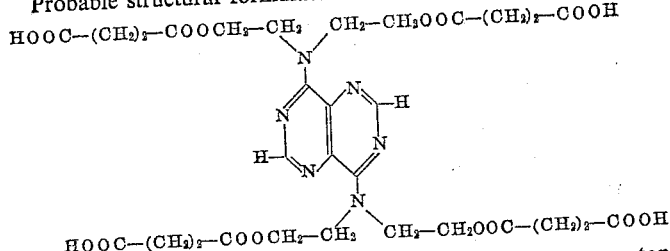

EXAMPLE 7

2,6-Bis-(Diethanol-Amino)-4,8-Dipiperidyl-Pyrimido-[5,4-d]-Pyrimidine-Tetra-(Carbo-Benzoxy-Glycine)-Ester A solution of 6.2 gm. (0.03 mol) N,N'-dicyclohexyl-carbo-di-imide in anhydrous ether was slowly added dropwise to a solution of 2.5 gm. (0.005 mol) 2,6-bis-(di-ethanol-amino)-4,8-dipiperidyl-pyrimido-[5,4-d]-pyrimidine, 6.2 gm. (0.03 mol) carbobenzoxy-glycine and 2 gm. pyridine in 100 cc. tri-ethylenechloride, accompanied by shaking. After separating the precipitated dicyclohexyl-urea by vacuum filtration, the mother liquor was evaporated almost to dryness in vacuo. After digesting the residue twice with warm methanol, the reaction product remained behind as an insoluble substance. The yield of raw product was 5.4 gm., which corresponds to 85% of theory. For purification, the raw product was reprecipitated once from ethylene chloride by means of methanol. The purified product was obtained in the form of pale-yellow, microcrystalline needles having a melting point of 150 to 152° C.

Analysis.—$C_{64}H_{76}N_{12}O_{16}$: Molecular weight, 1269.4. Calculated: C, 60.82%; H, 6.03%. Found: C, 60.60%; H, 6.49%.

Probable structural formula:

EXAMPLE 8

2,6-Bis-(Diethanol-Amino)-4,8-Dipiperidyl-Pyrimido-[5,4-d]-Pyrimidine-Diphthalic Acid Semiester A mixture of 2.5 gm. (0.005 mol) 2,6-bis-(diethanol-amino)-4,8-dipiperidyl-pyrimido-[5,4-d]-pyrimidine, 2.2 gm. (0.015 mol) phthalic acid anhydride and 50 cc. acetone was refluxed for 30 minutes. Thereafter, the reaction mixture was taken up in about 200 cc. water whereupon the reaction product separated out in the form of a yellow, greasy prepicitate which solidified after a short period of standing. The precipitate was separated, washed with water and dried at room temperature in a vacuum desiccator. The yield of raw product was 4.2 gm., which corresponds to 76% of theory. For purification, the raw product was reprecipitated 3 times from very dilute sodium hydroxide with the aid of glacial acetic acid. The purified product was obtained in the form of a deep yellow powder having a melting point of 128 to 130° C.

Probable structural formula:

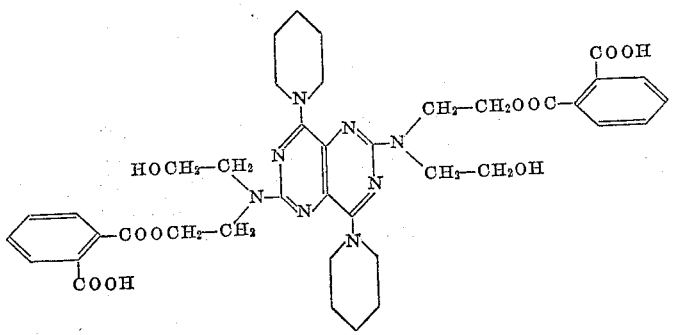

EXAMPLE 9

2,6-Bis-(Diethanol-Amino)-4,8-Dipiperidyl-Pyrimido-[5,4-d]-Pyrimidine-Tetra-Betaine Ester-Chloride 1.0 gm. (about 0.001 mol) of 2,6-bis-(diethanol-amino)-4,8-dipiperidyl-pyrimido-[5,4-d]-pyrimidine-tetra-chloro acetic acid ester was dissolved in 100 cc. of cold, dry acetone and then gaseous trimethyl-amine was passed through the resulting solution for about one hour. After about 30 minutes the reaction product began to separate out in the form of a faint yellowish-green micro-

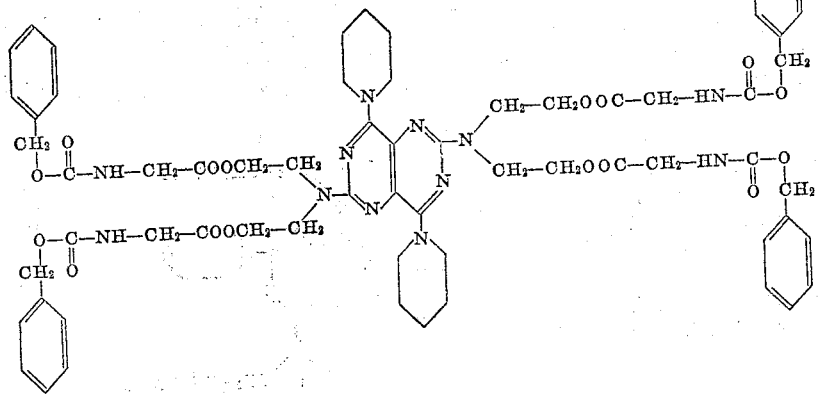

crystalline precipitate. The precipitate was separated by vacuum filtration, washed with dry acetone and dried at room temperature in vacuo. The yield was 1.2 gm., which corresponds to 92% of theory. For analysis, the raw product was reprecipitated once from a cold solution in absolute alcohol by addition of acetone. The purified product was obtained in the form of a yellow microcrystalline powder having a melting point of 196 to 198° C., and was dried in vacuo at 80° C. (the substance turned orange and became hygroscopic).

Analysis.—$C_{44}H_{80}N_{12}O_8Cl_4$: Molecular weight, 1047.0. Calculated: C, 50.47%; H, 7.70%. Found: C, 50.00%; H, 8.07%.

Probable structural formula:

Probable structural formula:

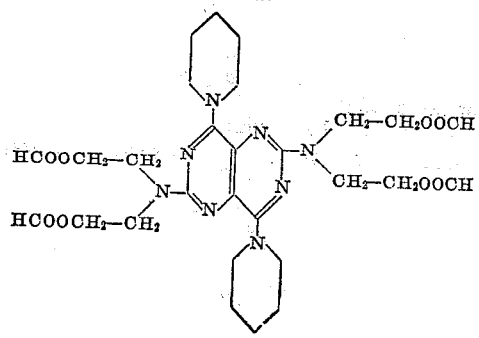

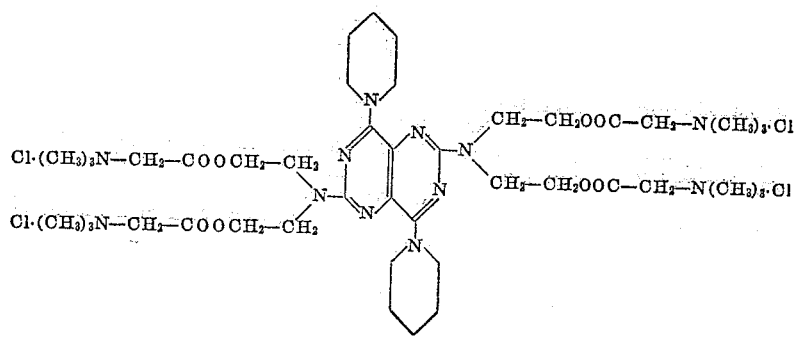

The same compound was obtained (in addition to the corresponding mono-, di- and tri-betaine esters) upon esterification of 2,6-bis-(diethanol-amino-4,8-dipiperidyl-pyrimido-[5,4-d]-pyrimidine with betaine hydrochloride by means of N,N'-dicyclohexyl carbodi-imide.

EXAMPLE 10

*Formic Acid Esters of Various Pyrimido-Pyrimidyl Aminoalcohols*

(a) *2,6 - bis - (diethanol-amino)-4,8-dipiperidyl-pyrimido-pyrimidine-tetra-formic acid ester.*—Phosphorous pentoxide was introduced into a solution of 2.5 gm. (0.005 mol) 2,6-bis-(diethanol-amino)-4,8-dipiperedyl-pyrimido-[5,4-d]-pyrimidine in 50 cc. of about 99% formic acid, accompanied by shaking and cooling, until a small amount remained initially undissolved. Thereafter, the resulting reaction mixture was allowed to stand at room temperature for about 14 hours under exclusion of moisture. The deep orange solution, thus obtained, was poured into about 300 cc. water whereupon the reaction product separated out in the form of an orange crystalline precipitate. The precipitate was separated by vacuum filtration, washed and dried. The yield was 2.2 gm., which corresponds to 71% of theory. For analysis, the raw product was reprecipitated once from formic acid by adding water to the solution, and was then recrystallized once from ethanol. The pure product was obtained in the form of fine, yellow needles having a melting point of 128 to 130° C.

Analysis.—$C_{28}H_{40}N_8O_8$: Molecular weight, 616.7. Calculated: C, 54.53%; H, 6.54%. Found: C, 54.40%; H, 7.12%.

Using a procedure analogous to that described above, the following formic acid esters were produced from the starting materials indicated in each case.

(b) *2,6-bis-(diethanol-amino)-4,8-dimorpholyl-pyrimido-[5,4-d]-pyrimidine-tetra-formic acid ester.*—Melting point 162 to 163° C., from 2,6-bis-(diethanol-amino)-4,8-dimorpholyl-pyrimido-[5,4-d]-pyrimidine and formic acid.

Probable structural formula:

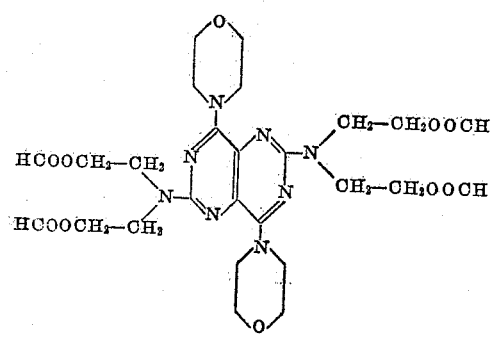

(c) *2,6 - dimorpholyl-4,8-di-(methyl-ethanol-amino)-pyrimido-[5,4-d]-pyrimidine-di-formic acid ester.*—Melting point 159 to 160° C., from 2,6-dimorpholyl-4,8-di-(methyl-ethanol-amino)-pyrimido-[5,4-d]-pyrimidine and formic acid.

Probable structural formula:

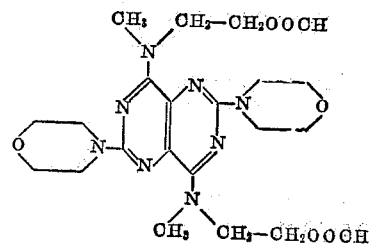

EXAMPLE 11

2,6-Bis-(Diethanol-Amino)-4,8-Dipiperidyl-Pyrimido-[5,4-d]-Pyrimidine Tetra-Chloral-Hemi-Acetal 0.8 cc. (0.08 mol) of anhydrous chloral was slowly added dropwise to a cold solution of 1 gm. (0.002 mol) 2,6 - bis-diethanol - amino) - 4,8 - dipiperidyl - pyrimido-[5,4-d]-pyrimidine in 3.5 cc. pure, dry dimethyl formamide (or into about 25 cc. dry dioxane). A change of color occurred and the odor of chloral immediately disappeared as each drop was added. The solution, thus obtained, was poured into about 120 cc. water, whereupon the reaction product separated out in the form of a greenish-yellow, greasy precipitate. Despite digesting it several times with water and allowing it to stand for an extended period of time, the precipitate could not be obtained in a crystalline form. The product was readily soluble in most organic solvents. In contrast to the starting material, it was rather difficultly soluble in dilute acids and was completely free from the taste and odor of chloral.

Probable structural formula:

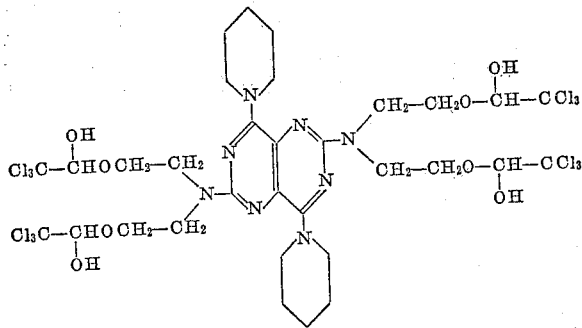

By reacting 2,6-bis-(diethanol-amino)-4,8-dipiperidyl-pyrimido-[5,4-d)-pyrimidine with a large excess of chloral and without a solvent medium, a solid reaction product was obtained which, however, contained much more chloral than the compound described above.

EXAMPLE 12

2,6-Bis-(Diethanol-Amino)-4,8-Dipiperidyl-Pyrimido-[5,4-d]-Pyrimidine Di-(α-D-Gluco-Pyranoside)

A mixture of 27 gm. (0.065 mol) 1-bromo-2,3,4,6-tetra-acetyl-D-glucose, 350 cc. dioxane, 4.5 gm. (0.009 mol) 2,6-bis-(diethanol-amino)-4,8-dipiperidyl-pyrimido-[5,4-d]-pyrimidine, 7.2 gm. silver carbonate and 10 gm. anhydrous sodium sulfate was stirred for two weeks at room temperature under exclusion of light. After evaporating the dioxane solvent in vacuo, the oily residue was taken up in ether and the precipitate formed thereby, consisting of silver bromide and sodium sulfate, was filtered off. The ethereal filtrate was then shaken three times with 0.1 N hydrochloric acid, the acid aqueous phase was separated and adjusted with 2.5 N ammonia to a pH of 8.6. The oil which separated out (containing a mixture of mono-, di-, tri- and tetra-acetyl-glucosides) was separated by centrifuging, dried, dissolved in a small amount of methanol and this solution was adsorbed on silica gel. Thereafter, the silica gel was eluted in a chromatography column with a mixture of 9 parts ether and 1 part n-butanol for the purpose of separating the acetyl glucosides. By evaporation of the corresponding fractions, the 2,6-bis-(diethanol-amino)-4,8 - dipiperidyl - pyrimido-[5,4-d]-pyrimidine-di-(2,3,4,6-tetra-O-acetyl - α - D-gluco-pyranoside) was first obtained. This product was saponified with barium hydroxide in an ethereal solution containing a small amount of water into the desired 2,6-bis-(diethanol-amino) - 4,8 - dipiperidyl - pyrimido - [5,4-d]-pyrimidine-di-(α-D-glucopyranoside). The product had an undefined melting point between 120 and 180° C. The yield, based on the amount of 2,6-bis-(diethanol-amino)-4,8-dipiperidyl - pyrimido - [5,4-d] - pyrimidine originally used, of the diglucoside was 10% of theory.

Analysis.—$C_{36}H_{60}N_8O_{14}$: Molecular weight, 828.9. Calculated: C, 52.0%; H, 7.3%; N, 13.5%. Found: C, 51.65%; H, 7.5%; N, 12.72%.

Ultra-violet spectrum: λ max.=280 mμ (1/50 N HCl); ε corr. 280 mμ (1/50 N HCl)=22,390.

EXAMPLE 13

2,6-Bis-(Diethanol-Amino) - 4,8 - Dipiperidyl - Pyrimido-[5,4-d] - Pyrimidine - Mono - β - D - Glucopyranoside-Uronic Acid A mixture of 12.2 gm. (0.031 mol) methyl-1-bromo-2,3,4-triacetyl-β-D-glucouronide, 200 cc. dioxane, 1.93 gm. (0.038 mol) 2,6-bis-diethanol-amino)-4,8-dipiperidyl-pyrimido-[5,4-d]-pyrimidine, 3.2 gm. silver carbonate and 4 gm. anhydrous sodium sulfate was stirred at room temperature for two weeks under exclusion of light. The reaction mixture, thus obtained, was worked up in the same manner as described in Example 12. The 2,6-bis-(diethanol-amino)-4,8-dipiperidyl-pyrimido - [5,4-d] - pyrimidine mono-β-D-glucopyranoside uronic acid obtained after saponification melted at 136 to 140° C. The yield, based on the amount of 2,6-bis-(diethanol-amino)-4,8-dipiperidyl - pyrimido - [5,4-d] - pyrimidine originally used, was 15% of theory for the monoglucouronide.

Analysis.—$C_{30}H_{48}N_8O_{10}$: Molecular weight, 680.7. Calculated: C, 52.93%; H, 7.11%; N, 16.46%; mol. wt., 680.7. Found: C, 52.80%; H, 7.33%; N, 16.10%, 16.65%; mol. wt., 690.0.

Ultra-violet spectrum: λ max.=282 mμ (1/100 N HCl); ε corr. 280 mμ (1/100 N HCl)=17,950. λ max.=287.5 mμ (methanol); α, 287.5 (methanol)=38.0.

EXAMPLE 14

Biosynthesis of: 2,6-Bis-(Diethanol-Amino)-4,8-Dipiperidyl - Pyrimido - [5,4-d] - Pyrimidine - Mono - β - D-Glucopyranoside-Uronic Acid (a) In the rat.—A gall bladder catheter was applied to rats under urethane anesthesia. Thereafter, 100 mgm./kg./rat of 2,6 - bis - (diethanol-amino) - 4,8 - dipiperidyl-pyrimido-[5,4-d]-pyrimidine in a hydrochloric acid solution having a pH of 3 to 4.0 were injected into the tail vein and the gall bladder secretion was collected over a period of four hours. The amount of bile thus collected was admixed with an equal volume of water and with four times its volume of 0.2 N boric acid buffer solution, pH 10.0. Thereafter, the entire mixture was shaken five times with half the volume of n-butanol. The combined butanol phases were evaporated to dryness. The dry residue was dissolved in a minimum amount of methanol and precipitated from solution with a large excess of ether. After separating the sediment after centrifuging and drying it, it was again dissolved in as small an amount of methanol as possible and the solution was adsorbed on silica gel. The silica gel was then eluted in a chromatography column with a mixture of 3 parts ether and 1 part methanol, while gradually increasing the methanol concentration. By evaporating the individual fractions, a green amorphous powder was obtained which was recrystallized from ethanol for purposes of analysis. The product was identical with the synthesized 2,6-bis-(diethanol-amino)-4,8-dipiperidyl-pyrimido - [5,4 d] - pyrimidine-mono-β-D-glucopyranoside uronic acid, of Example 13.

(b) In rabbits.—A gall bladder catheter was applied to a rabbit under urethane anesthesia. Thereafter, 350 to 400 mgm./kg. of 2,6-bis-(diethanol-amino)-4,8-dipiperidyl-pyrimido-[5,4-d]-pyrimidine were intraveneously injected into the rabbit (100 mgm./kg. doses at half hour intervals). The gall bladder secretion was collected over a period of six hours. The gall bladder secretion was worked up in a manner analogous to the manner described under (a) above. In this case the end product was also identical with the synthesized 2,6-(diethanol-amino)-4,8-dipiperidyl - pyrimido - [5,4-d] - pyrimidine - mono - β-D-glucopyranoside uronic acid of Example 13. The yield of isolated 2,6 - bis - (diethanol-amino) - 4,8 - dipiperidyl-pyrimido - [5,4-d] - pyrimidine - mono - β - D - glucopyranoside uronic acid, both in the rat and in the rabbit was about 60 to 70% of theory, based on the injected amount of 2,6 - bis - (diethanol-amino) - 4,8-dipiperidyl-pyrimido-[5,4-d]-pyrimidine.

EXAMPLE 15

*2,6 - Bis - (Diethanol-Amino) - 4,8 - Dipiperidyl - Pyrimido - [5,4-d] - Pyrimidine - Tetra - (Carbo - Benzoxy-Glycine)-Ester*

A mixture of 2.5 gm. (0.005 mol) 2,6-bis-(diethanol-amino) - 4,8 - dipiperidyl - pyrimido - [5,4-d] - pyrimidine, 5.8 gm. (about 0.025 mol) carbo-benzoxy-glycine-cyanomethyl ester, and 100 cc. acetone was refluxed for 30 minutes. After evaporating the solvent in vacuo, the reaction product remained behind in the form of a viscous orange oil which did not solidify in crystalline form until standing for several weeks. The product was digested with methanol, separated by vacuum filtration, washed with a small amount of methanol and dried. The yield of practically pure reaction product, melting point 150 to 152° C., was 2.6 gm., which corresponds to 41% of theory.

Probable structural formula:

EXAMPLE 17

*2,6-bis(Diethanol-Amino)-4,8-Dipiperidyl-Pyrimido-[5,4-d]-Pyrimidine-Mono-Succinic Acid Semiester*

A solution of 0.5 gm. (0.005 mol) succinic acid anhydride in ethylene chloride was added dropwise, accompanied by stirring, to a solution of 2.5 gm. (0.005 mol) 2,6-bis(diethanol-amino)-4,8-dipiperidyl-pyrimido - [5,4-d]-pyrimidine in 25 cc. ethylene chloride which had been heated to about 50° C. The resulting reaction mixture was then refluxed for 15 minutes. After allowing the honey-colored reaction solution to cool, the raw mono-succinic acid semiester separated out as a yellowish-brown oil. For the purpose of separating unreacted starting material and small amounts of di- and tri-succinic acid semiesters, the oil was dissolved in a small amount of methanol, the solution was adsorbed on silicagel (Merck, 0.2–0.5 mm.), introduced into a chromatography column filled with silicagel, and eluted with a mixture of butanol and methanol (1:9). By evaporating the combined individual elution fractions in vacuo the 2,6-bis-(diethanol-amino)-4,8-dipiperidyl - pyrimido - [5,4-d] - pyrimidine mono-succinic acid semiester was obtained in the form of a honey-colored viscous oil. In a thin-film chromatogram according to Stahl over silicagel G (Merck) with a

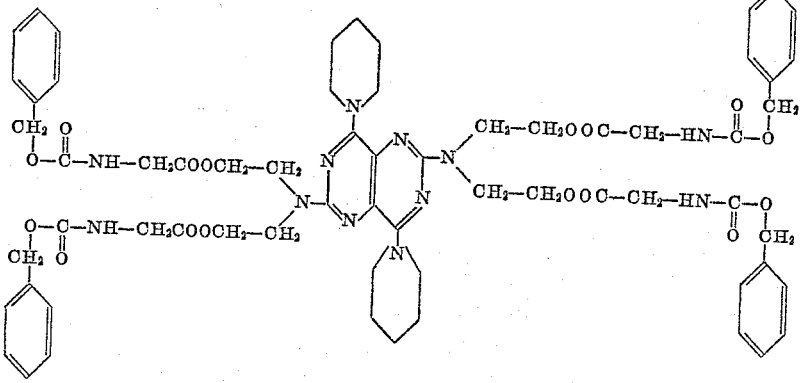

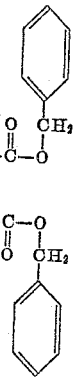

EXAMPLE 16

*2,6 - Bis - (Diethanol-Amino) - 4,8 - Dipiperidyl - Pyrimido-[5,4-d]-Pyrimidine-Tetra-Hippuric Acid Ester*

Following a procedure analogous to that described in Example 7, but using 2,6-bis-(diethanol-amino)-4,8-dipiperidyl-pyrimido-[5,4-d]-pyrimidine and hippuric acid as starting materials and dimethylformamide as the solvent medium, 2,6 - bis - (diethanol - amino) - 4,8 - dipiperidyl-pyrimido-[5,4-d]-pyrimidine-tetra-hippuric acid ester was obtained with a yield of 2.6 gm. which corresponds to 45% of theory. For analysis, the raw product was recrystallized from methanol. The purified product was obtained in the form of an orange-red microcrystalline powder having a melting point of 165 to 167° C.

*Analysis.*—$C_{60}H_{68}N_{12}O_{12}$: Molecular weight, 1149.3. Calculated: C, 62.71%; H, 5.96%. Found: C, 62.95%; H, 6.21%.

Probable structural formula:

mixture of butanol and methanol (1:9) the $R_f$-value was about 0.6 (light yellow spot; under ultraviolet light bluish-green fluorescence; $R_f$-value of starting material: 0.8). On a paper-chromatogram [Schleicher and Schull paper No. 2043bM, liquid agent: Mixture of butanol, glacial acetic acid and water (4:1:5; upper phase), descending] the $R_f$- value is 0.86 (light yellow spot, bluish-green fluorescence; $R_f$-value of starting material: 0.94; $R_f$-value of tetra-succinic acid semiester: about 0.40).

EXAMPLE 18

*2,6-bis-(Diethanol-Amino)-4,8-Dipiperidyl-Pyrimido-[5,4-d]-Pyrimidine Mono-Sulfuric Acid Ester*

1.4 cc. (0.02 mol) chlorosulfonic acid were added dropwise to a solution of 1.0 gm. (0.002 mol) 2,6-bis-(diethanol-amino)-4,8-dipiperidyl-pyrimido-[5,4-d] - pyrimidine in 50 cc. dry ethylene chloride. The resulting reaction solution was allowed to stand for several days at room temperature, whereby the raw reaction product

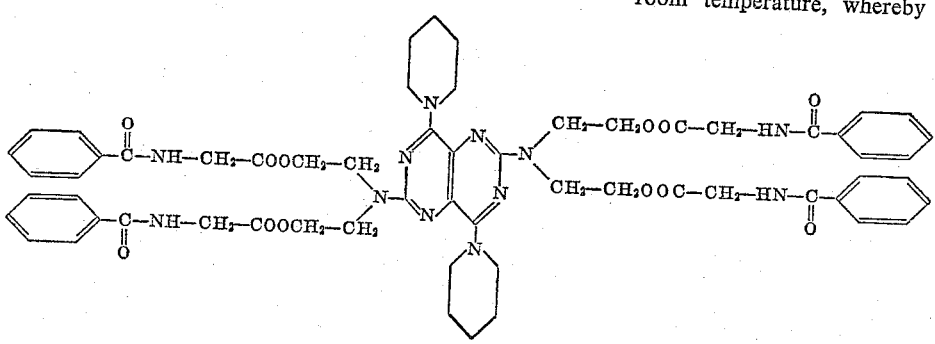

separated out. The solvent was decanted as much as possible and the reaction product was dried in vacuo to remove any residual solvent. The residue was taken up in a small amount of ethanol, and an alcoholic solution of ammonia was added to the ehanol solution. The reaction product separated out as a solid yellow precipitate (believed to be the ammonium salt of the mono ester). For further purification, the precipitate was dissolved in dilute ammonia; inorganic impurities were removed by adding a little acetone to the ammonia solution. After removing these by filtration, more acetone was added to the filtrate, thereby precipitating the ammonium salt of the acid sulfuric acid ester. For analysis, the precipitated monoester salt was again dissolved in dilute ammonia and reprecipitated by adding glacial acetic acid to the ammonia solution. The purified reaction product was obtained in the form of a yellow microcrystalline substance (whetstone-shaped crystals) having no melting point up to 350° C.

*Analysis.*—$C_{24}H_{40}N_8O_7S$: Molecular weight; 584.7. Calculated: C, 49.30%; H, 6.90%. Found: C, 49.10%, 48.80%; H, 7.58%; 7.56%.

EXAMPLE 19

*2,6-bis(Diethanol-Amino)-4,8-Dipiperidyl-Pyrimido-[5,4-d]-Pyrimidine Tetra-(β-Hydroxyethyl)-Ether*

A slow stream of ethyleneoxide was passed for 6 hours through a solution of 2.5 gm. (0.005 mol) 2,6-bis-(diethanol-amino)-4,8-dipiperidyl-pyrimido-[5,4-d] - pyrimidine and a few drops of concentrated sulfuric acid in 25 cc. dimethylformamide, the solution having been previously warmed to about 75° C. Thereafter, the dimethylformamide was evaporated from the reaction mixture in vacuo. The residue was initially an oily substance which, however, solidified into a partially crystalline mass after a short period of time. The solidified residue was digested with a small amount of methanol, whereupon the major amount of the crystalline portion remained undissolved (unreacted starting material), while the remainder of the residue went into solution in the methanol. The undissolved matter was separated from the solution by vacuum filtration. The filtrate contained the desired ether as well as a small quantity of unreacted pyrimido-[5,4-d]-pyrimidyl- aminoalcohol. For further purification and separation the filtrate was absorbed on silicagel (Merck, 0.2–0.5 mm.) and this silicagel was placed into a chromatography column packed with silicagel. The entire column was then eluted first with a mixture of butanol and methanol (1:9), subsequently with a mixture of methanol and dimethylformamide (1:9) and finally with dimethylformamide alone. The elution fractions were collected and evaporated in vacuo. The ether reaction product was thus obtained in the form of a viscous honey-colored oil. Upon thin-film chromatography according to Stahl over silicagel G (Merck) with a mixture of butanol and methanol (1:9) the $R_f$-value was 0.06 (light yellow spot with yellowish-green fluorescence under ultra-violet light). $R_f$-value of starting material: 0.81.

The basic-substituted pyrimido-[5,4-d]-pyrimidines having the structural Formula I above and their pharmacologically acceptable addition salts with non-toxic bases and acids exhibit useful pharmacological properties, especially cardiovascular and spasmolytic activities.

Typical examples of non-toxic, pharmacologically acceptable addition salts are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid and the like.

While we have illustrated the present invention with the aid of certain representative embodiments thereof, it will be readily apparent to those skilled in the art that our invention is not limited to those embodiments, and that various changes and modifications may be made without departing from the spirit of the invention or the scope of the appended claims.

We claim:

1. A compound selected from the group consisting of basic-substituted pyrimido-[5,4-d]-pyrimidines of the formula

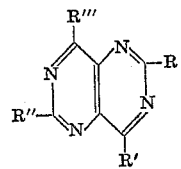

wherein from one to four, inclusive, of substituents R, R', R" and R''' are basic substituents of the formula

wherein Y is a substituent of the formula

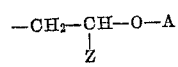

wherein A is selected from the group consisting of lower alkyl, hydroxy-lower alkyl, sulfate, formyl, lower alkanoyl, halo-lower alkanoyl, carboxyl-lower alkanoyl, hydroxy-lower alkanoyl, amino-lower alkanoyl, benzoyl-amino-lower alkanoyl, carbobenzoxyamino-lower alkanoyl, quaternary ammonium-lower alkanoyl, morpholyl-lower alkanoyl, benzoyl, hydroxybenzoyl, carboxy-benzoyl, hexose, lower carbalkoxy-hexose, carboxy-hexose, acetoxy-hexose and a radical of the formula

wherein B is selected from the group consisting of lower alkyl, chloro-lower alkyl and bromo-lower alkyl, and Z is selected from the group consisting of hydrogen and lower alkyl, and X is selected from the group consisting of hydrogen lower alkyl, hydroxy-lower alkyl and substituents of the formula

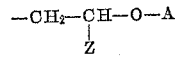

wherein A and Z have the meanings defined above, and the remaining substituents R, R', R" and R''' are selected from the group consisting of hydrogen, halogen, thiol, lower alkylthio, amino, lower alkyl-amino, (hydroxy-lower alkyl)-amino, piperidyl and morpholyl and their non-toxic, pharmacologically acceptable acid addition salts.

2. 2,6-bis-(diethanol-amino)-4,8-dipiperidyl - pyrimido-[5,4-d]-pyrimidine-mono-succinic acid semi-ester.

3. 2,6-bis-(diethanol-amino)-4,8-dipiperidyl - pyrimido-[5,4-d]-pyrimidine-mono-β-D - glucopyranoside - uronic acid.

4. 2,6-bis-(diethanol-amino)-4,8-dipiperidyl - pyrimido-[5,4-d]-pyrimidine-tetra-betaine-ester-chloride.

5. 2,6-bis-(diethanol-amino)-4,8-dipiperidyl - pyrimido-[5,4-d]-pyrimidine-tetra-chloral-hemi-acetal.

6. 2,6-bis-(diethanol-amino)-4,8-dipiperidyl - pyrimido-[5,4-d]-pyrimidine-tetra-succinic acid semi-ester.

7. 2,6-bis-(diethanol-amino)-4,8-dipiperidyl - pyrimido-[5,4-d]-pyrimidine-di-α-D-glucopyranoside.

8. 2,6-bis-(diethanol-amino)-4,8-dimorpholyl-pyrimido-[5,4-d]-pyrimidine-tetra-succinic acid semi-ester.

9. 2,6-bis-(di-isopropanol - amino) - 4,8 - dimorpholyl-pyrimido-[5,4-d]-pyrimidine-tetra-succinic acid semi-ester.

References Cited in the file of this patent
FOREIGN PATENTS
807,826    Great Britain _____ Jan. 21, 1959

UNITED STATES PATENT OFFICE
CERTIFICATE OF CORRECTION

Patent No. 3,074,928 January 22, 1963

Josef Roch et al.

It is hereby certified that error appears in the above numbered patent requiring correction and that the said Letters Patent should read as corrected below.

Column 1, line 32, after "hydroxyl," insert -- substituted hydroxyl, thiol, --.

Signed and sealed this 27th day of August 1963.

(SEAL)
Attest:

ERNEST W. SWIDER
Attesting Officer

DAVID L. LADD
Commissioner of Patents